(12) United States Patent
Chen

(10) Patent No.: US 6,205,273 B1
(45) Date of Patent: Mar. 20, 2001

(54) WAVEGUIDE GRATING ROUTER HAVING A PREDETERMINED COMPOSITE AMPLITUDE SPECTRUM

(75) Inventor: Jerry Chia-yung Chen, Arlington, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/260,635

(22) Filed: Mar. 2, 1999

(51) Int. Cl.$^7$ ....................................... G02B 6/34
(52) U.S. Cl. .................. 385/37; 385/39; 385/24; 385/46; 359/130
(58) Field of Search ................. 385/37, 39, 48, 385/46, 24; 359/130

(56) References Cited

U.S. PATENT DOCUMENTS

| | | | |
|---|---|---|---|
| 4,737,002 | * 4/1988 | Boucouvalas | 385/39 |
| 5,002,350 | 3/1991 | Dragone | 350/96 |
| 5,136,671 | 8/1992 | Dragone | 385/46 |
| 5,243,672 | 9/1993 | Dragone | 385/46 |
| 5,357,589 | * 10/1994 | Brown, Jr. et al. | 385/16 |
| 5,881,199 | * 3/1999 | Li | 385/14 |
| 5,953,467 | * 9/1999 | Madsen | 385/37 |
| 5,982,960 | * 11/1999 | Akiba et al. | 385/37 |

OTHER PUBLICATIONS

O. Ishida et al, "Loss–Imbalance Equalisation of Arrayed Waveguide Grating Add–Drop Multiplexer", Electronics Letters, vol. 30, No. 14, Jul. 7, 1994, pp. 1160–1162.

J. C. Chen et al, "Waveguide Grating Routers With Greater Channel Uniformity", Electronics Letters, vol. 33, No. 23, Nov. 6, 1997, pp. 1951–1952.

O. Ishida et al, "Loss–Imbalance Equalization in Arrayed–Waveguide–Grating (AWG) Multiplexer Cascades", Journal of Lightwave Technology, vol. 13, No. 6, Jun. 1995, pp. 1155–1163.

* cited by examiner

*Primary Examiner*—Hemang Sanghavi
*Assistant Examiner*—Sung H. Pak
(74) *Attorney, Agent, or Firm*—J. J. Brosemer

(57) ABSTRACT

In a waveguide grating router, a predetermined composite transmission spectrum output is achieved by eliminating loss imbalances through the use of variable loss elements. The variable loss elements are introduced to the waveguide grating router's waveguide ports, such that the loss of a transmitted signal is independent of wavelength. The waveguide grating router includes at least one input waveguide and a plurality of output waveguides. The variable loss element is introduced to a predetermined group of output waveguides to produce a predetermined composite amplitude spectrum of the output signals. To provide a predetermined composite amplitude output spectrum, the variable loss elements may be implemented in a variety of ways, including a method of varying the cross-sectional areas of the router's waveguide ports to introduce more loss.

16 Claims, 5 Drawing Sheets

500

700

WAVEGUIDE GRATING ROUTER HAVING A PREDETERMINED COMPOSITE AMPLITUDE SPECTRUM

FIELD OF THE INVENTION

The invention relates generally to optical devices and, more particularly, to waveguide grating routers.

BACKGROUND OF THE INVENTION

Waveguide grating routers in conventional lightwave systems are used as optical switches, multiplexers, demultiplexers, detectors, add/drop filters, one by N (1×N) and N by one (N×1) splitters and N by N (N×N) arrays. Typically, such waveguide grating routers include an interconnection apparatus having a plurality of closely spaced input waveguides communicating with an input of a star coupler. An output of the star coupler communicates with an optical grating comprising a series of optical waveguides in which each of the grating waveguides differ in length with respect to its nearest neighbor by a predetermined fixed amount. The optical grating is further connected to an input of a second star coupler, the outputs of which form outputs of the switching, multiplexing, and demultiplexing apparatus. Waveguide grating routers are also frequently referred to as "frequency routing devices" and are further described in U.S. Pat. No. 5,002,350, issued Mar. 26, 1991 to C. Dragone, entitled "Optical Multiplexer/Demultiplexer" (hereinafter "Dragone 1") and U.S. Pat. No. 5, 136,671, issued Aug. 4, 1992 to C. Dragone, entitled "Optical Switch, Multiplexer, and Demultiplexer" (hereinafter "Dragone 2"), both of which are hereby incorporated by reference.

A known characteristic of these waveguide grating routers is that they do not efficiently provide a predetermined composite amplitude spectrum for each of the output signals that may comprise many wavelengths or frequencies. Rather, these routers tend to attenuate signals in outer waveguides more than signals in the inner waveguides. Thus, the amplitude response of the router across the spectrum of wavelengths in the waveguides is nonuniform.

Attempts have been made to design a waveguide grating router with a uniform composite amplitude spectrum, yet prior designs have proven to be inefficient in deriving a predetermined composite amplitude spectrum, such as a uniform output spectrum, or such designs suffer severe loss. For example, one method uses a "loop-back" optical path with the waveguide grating router. "Loop-back" optical path connections are connections from the output signal fed back into a predetermined input port as described in an article entitled "Loss Imbalance Equalization of Arrayed Waveguide Grating Add-Drop Multiplexer," written by Osamu Ishida, et. al., that appeared in Electronics Letters, Vol. 30, No. 14, Jul. 7, 1994. However, this method has not been effective to equalize loss in waveguide routers.

Another method used for achieving a uniform output spectrum averages the waveguide grating router loss over the cascaded routers by shifting the port connections between adjacent routers, as described in an article entitled "Loss Imbalance Equalization in Arrayed Waveguide Grating (AWG) Multiplexer Cascades" written by Osamu Ishida, et al., that appeared in Journal of Lightwave Technology, Vol. 13, No. 6, Jun. 1995. However, such a system suffers severe loss due to the cascading of routers.

Still another method to achieve greater channel uniformity was described in an article entitled "Waveguide Grating Router with Greater Channel Uniformity" written by J. C. Chen and C. Dragone, that appeared in Electronics Letters, Vol. 33, No. 23, pp. 1951–2, Nov. 6, 1997. The method disclosed therein, which is incorporated by reference herein, uses auxiliary waveguides between adjacent grating arms in a waveguide grating router. Although such a system does not add loss, it also does not provide a predetermined composite amplitude spectrum, such as a uniform output spectrum. Specifically, the auxiliary waveguides simply help to shape the radiation pattern of the star coupler within the waveguide grating router to reduce channel non-uniformity. Thus, there is a need for a more effective means of providing a waveguide grating router having a predetermined composite amplitude spectrum thereby reducing the complexity of lightwave systems.

SUMMARY OF THE INVENTION

A waveguide grating router having a predetermined composite amplitude spectrum is achieved in accordance with the principles of the present invention by introducing loss into the waveguide grating router's waveguides. When the desired predetermined composite amplitude spectrum is a uniform amplitude spectrum, this same loss can produce loss equalization by the complete elimination of gain nonuniformity in all the output signals. The invention however is not limited to the production of a flat amplitude spectrum. For example, the predetermined composite amplitude spectrum may be sinusoidal, triangular, stepwise discrete, sloped, logarithmic, etc.

According to one aspect of the invention, a waveguide grating router is provided that includes at least one input waveguide and a plurality of output waveguides. A variable loss element is introduced to a predetermined group of output waveguides to produce a predetermined composite amplitude spectrum of the output signals.

According to another aspect of the invention, a waveguide grating router is provided that includes a plurality of input waveguide and a plurality of output waveguides. The variable loss element is introduced loss to a predetermined group of both input and output waveguides to yield output signals that exhibit the predetermined composite amplitude spectrum. In both types of waveguide grating routers, loss may be introduced in a variety of ways, including varying the cross-section of an input waveguide with respect to that of an output waveguide.

BRIEF DESCRIPTION OF THE DRAWING

The invention will be more readily understood after reading the following detailed description taken in conjunction with the accompanying drawing, in which.

DETAILED DESCRIPTION

A brief description of the prior art waveguide grating router is provided in order to develop a better understanding of the present invention and its departure from the prior art. As noted earlier, a waveguide grating router is also known as a frequency routing device. The latter term describes the action of light at different frequencies taking different paths through the router. In the description which follows, the terms "frequency" and "wavelength" may be used interchangeably when referring to the operation of the router.

Figure 1:
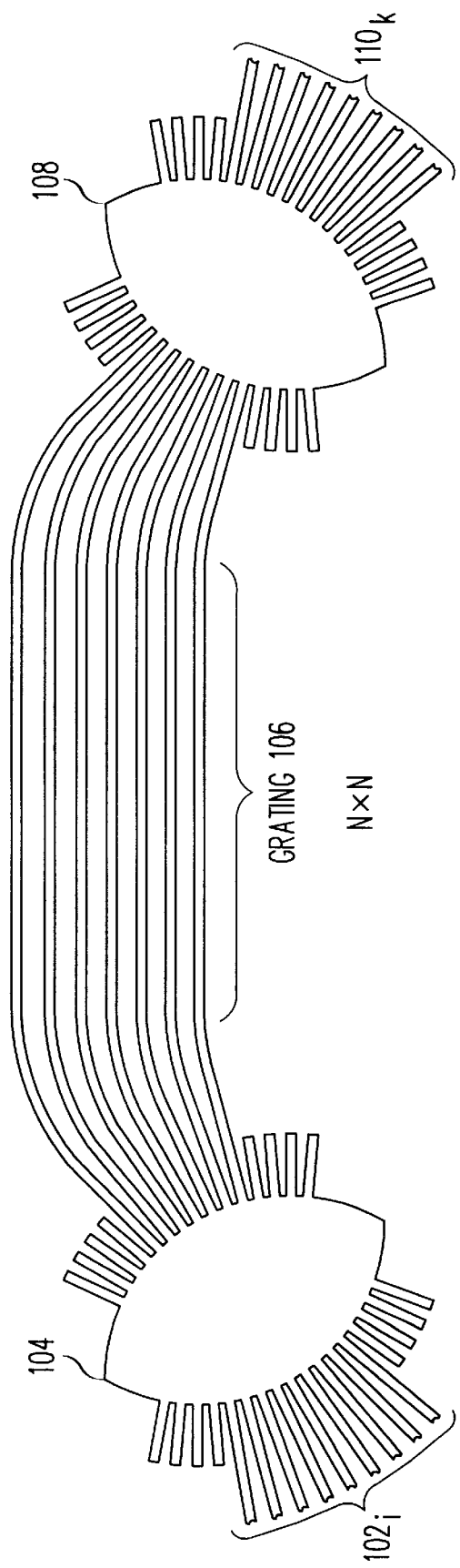
FIG. 1 depicts a block diagram of a prior art waveguide grating router.

FIG. 1 shows a prior art waveguide grating router 100 that includes a plurality of input waveguides $102_i$, i=1,2, ... N, a first and second free space region 104 and 108 respectively, an optical grating 106, and a plurality of output waveguides $110_k$, k=1,2, ... N. As illustrated, the plurality of input waveguides $102_i$, i=1, 2, ... N, is connected to free space region 104. The plurality of output waveguides $110_k$, k=1,2, ... N, extends from free space region 108 which is coupled to optical grating 106. Optical grating 106 includes a plurality of unequal length waveguides that provide a predetermined amount of path length difference to the corresponding plurality of input waveguides $102_i$. In operation, if a signal of amplitude A is applied to one of the input waveguides $102_i$, for example, input waveguide $102_l$, then signals of amplitudes $AT_{11}, AT_{12}, \ldots AT_{lN}$ are produced at output waveguides $110_k$ where $T_{ik}$ is the value of the transmission coefficient for input waveguide $102_l$ and the plurality of output waveguides $110_k$.

Figure 2:
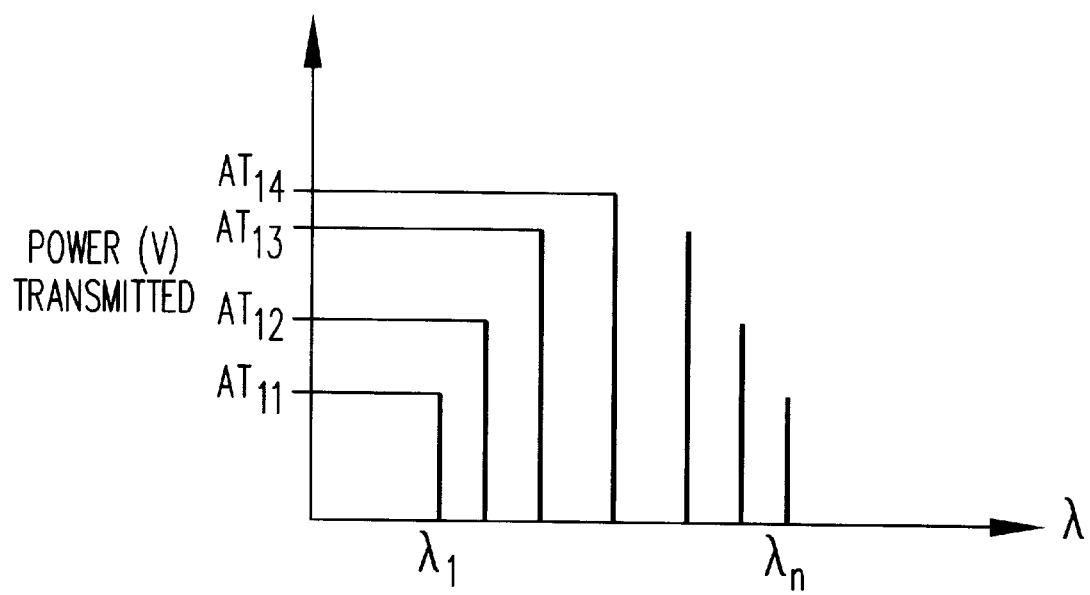
FIG. 2 illustrates a graph of the composite amplitude spectrum of the transmitted power of the signal's output from the various waveguides of the waveguide grating router illustrated in FIG. 1 at specified wavelengths (prior art)

As illustrated in FIG. 2, output signals from the plurality of output waveguides $110_k$ of the waveguide grating router form a Gaussian amplitude spectrum. With continued reference to FIG. 2, the composite amplitude spectrum of the output signals as a function of wavelength is shown illustrating the corresponding transmission coefficients $T_{ik}$ for the routing device. The details of the routing devices' constriction and operation are more fully described in Dragone 1, Dragone 2, and U.S. Pat. No. 5,243,672, issued Sep. 7, 1993 to C. Dragone, entitled "Planar Waveguide Having Optimized Bend", (hereinafter "Dragone 3"), which is hereby incorporated by reference.

Figure 3:
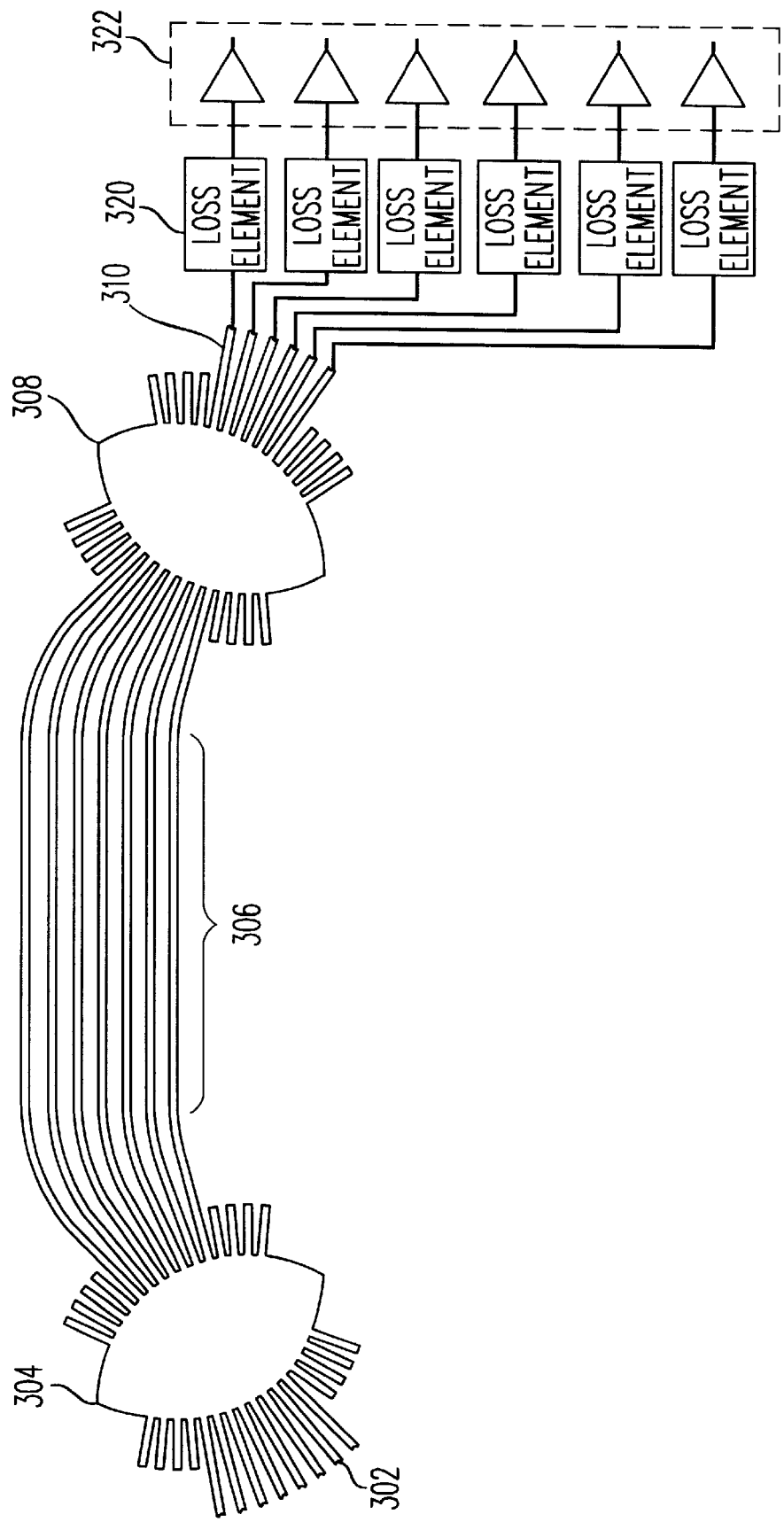
FIG. 3 is a block diagram of an embodiment of an N×N waveguide grating router with loss equalization.

FIG. 3 illustrates an embodiment of a waveguide grating router 300 in accordance with the present invention. Waveguide grating router 300 includes all of the elements of FIG. 1 including a plurality of input waveguides 302, a first free space region 304, an optical grating 306, a second free space region 308, and a plurality of output waveguides 310. However, unlike the prior art, waveguide grating router 300 also includes a plurality of variable loss elements 320. The plurality of variable loss elements 320 are optically coupled to a predetermined set of the output waveguides 310 to produce a predetermined composite amplitude spectrum in the output signals. Alternatively (not shown), variable loss elements 320 may be optically coupled to a predetermined set of input waveguides 302, instead of output waveguides 310, to produce a predetermined composite amplitude spectrum in the output signals. Variable loss permits shaping of the output signals from each waveguide independent of each other.

Functionally, the waveguide grating router of FIG. 3 directs a multiwavelength-input signal through a predetermined one of the input waveguides 302, where the input signal is a multiplexed signal with wavelengths, $\lambda_1, \lambda_2, \ldots \lambda_n$. The input signal is demultiplexed into component wavelengths with each of the component wavelengths directed to a predetermined one of the output waveguides 302 of the router. Specifically, the input signal is transmitted through the first free space region 304 to the optical grating 306. Due to differing lengths and curvatures of each waveguide that are separated by a fixed amount within the optical grating 306, the optical grating 306 phase-shifts each signal transmitted through each waveguide. Ultimately, the multiwavelength signal is directed through the router and separates into a number of output signals each exhibiting a wavelength component of the original input signal. Variable loss elements 320 apply loss to each output signal in a predetermined amount to achieve the desired predetermined composite amplitude spectrum. Optionally, as illustrated in FIG. 3, an amplifier 322 may be optically coupled to the plurality of output waveguides 310 to amplify the output signals after the loss is applied. The amplifier 322 will receive and amplify these output signals. Amplification is desirable in cases where a specific power level is required.

Figure 4:
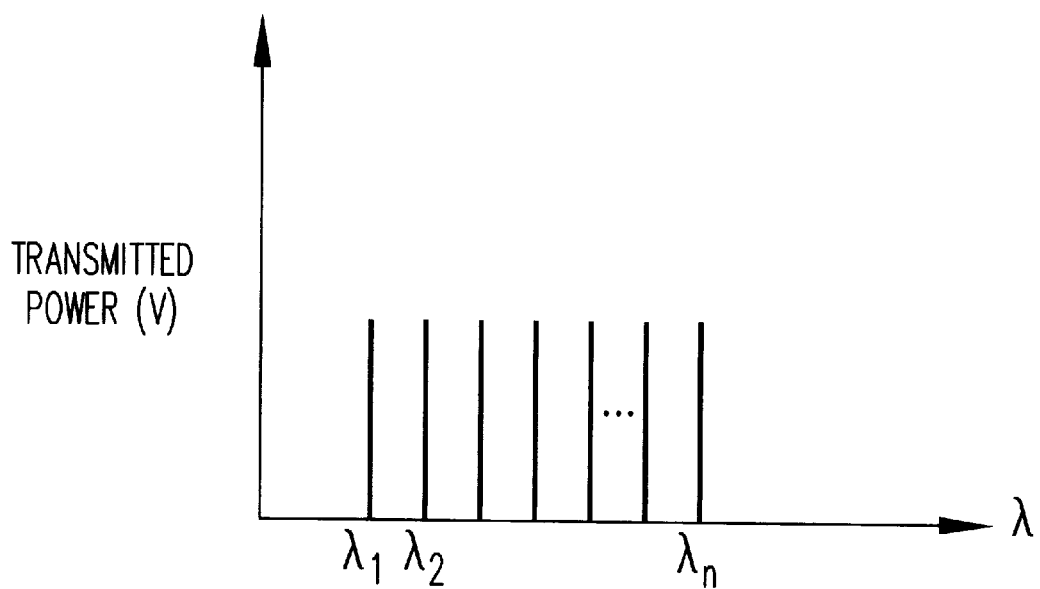
FIG. 4 depicts a graph of the transmitted power of the signal's output from the various waveguides of the waveguide grating router illustrated in FIG. 3 at specified wavelengths.

With simultaneous reference to FIG. 3 and FIG. 4, where a uniform amplitude spectrum is shown, loss elements 320 of FIG. 3 can be configured to alter the output signals, producing such a uniform composite amplitude spectrum. For example, if a 1×N waveguide grating router exhibiting a Gaussian amplitude spectrum, as shown in FIG. 2, is desired, the greatest loss should be introduced at the output waveguides closest to the center and less loss introduced at each adjacent port waveguide progressing toward the outermost waveguides.

Loss may be introduced in a variety of ways. One way is to vary the cross-sectional area of the output waveguides to the cross-sectional area of the input waveguide. This may be implemented, for example, by varying the waveguide widths, heights, cross-sectional shapes, position, and angular tilt. In addition, offsetting each connection of the output waveguides, for example, offset centers or intentional misalignment of the optical fiber which links the routing device to the rest of the multiwavelength lightwave system creates the same effect. Similarly, loss can be introduced by an output waveguide having different cross-sectional areas at different sections of the same output waveguide. For example, in FIG. 5, output waveguide 510 can have a larger cross-sectional area near the free space region 508 and a smaller cross-sectional area at the opposite end.

Other methods of introducing loss are also available. For example, loss can be introduced by "siphoning light" into a "dummy" waveguide. Such a dummy waveguide can be placed near the output waveguides so that a portion of the multiwavelength signal couples to the dummy waveguide. This is accomplished with directional coupler or a Y-branch splitter/tap. Still another way to introduce loss is through wavelength selective filters, such as asymmetrical Mach Zehnder interferometers or gratings, such as long period, Bragg and/or chirped.

Further, integrated loss may be made variable by placing an electrode over each output waveguide. Then, by electrically addressing each electrode with an appropriate signal, the loss, via refractive index changes, could be variably tuned. Optionally, the incorporation of a dopant similar to rare earth dopants for optical fibers, such as erbium, may be useful for tuning the loss where the loss elements are semiconductor devices.

Figure 5:
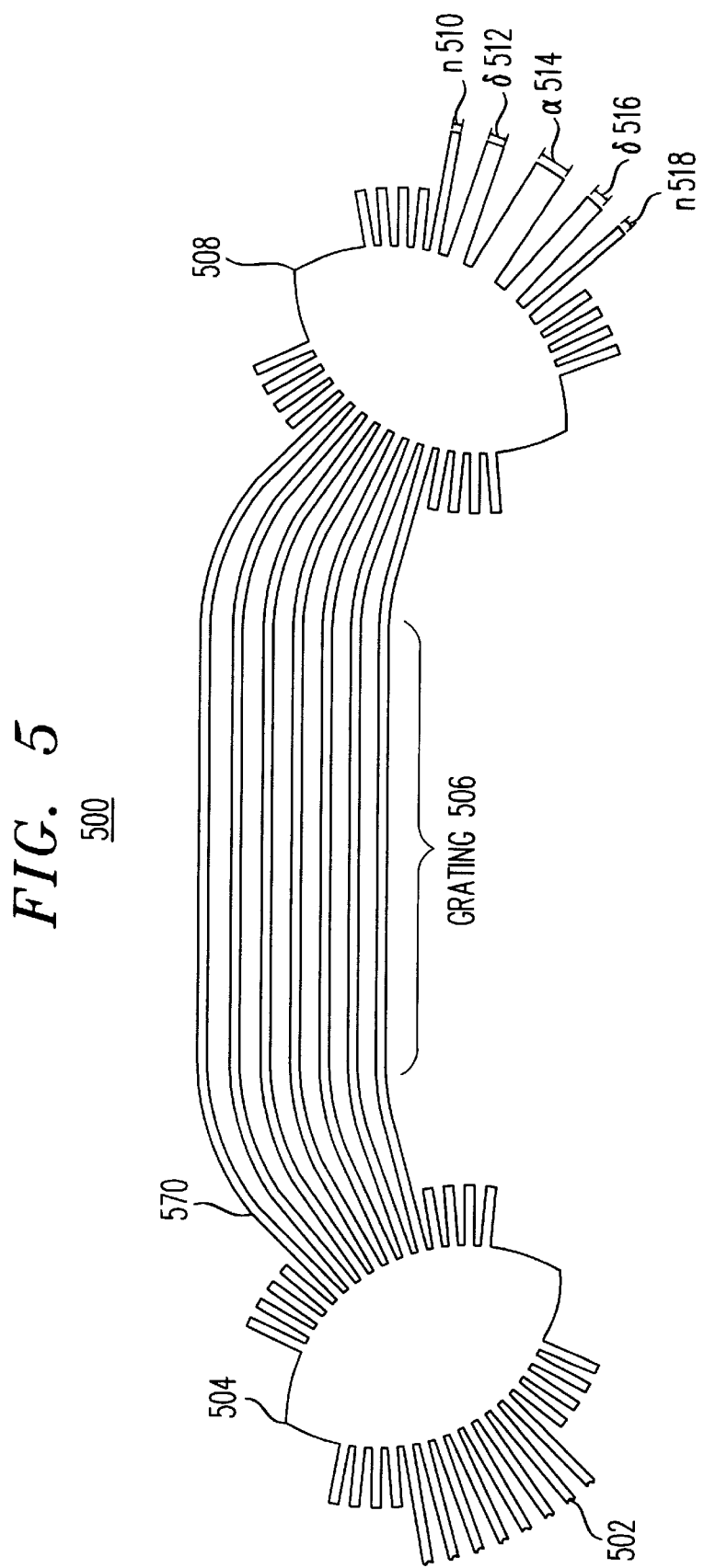
FIG. 5 shows an illustrative embodiment of an N×N router with loss equalization.

One aspect of the invention is shown by the embodiment of the waveguide grating router in FIG. 5, which generates a uniform amplitude spectrum. The waveguide grating router 500 shown therein includes a plurality of input waveguides 502, a first free space region 504, an optical grating 506, a second free space region 508, and a plurality of output waveguides 510–518. The output waveguides 510–518 are designed in such a way as to differ in cross-sectional width from that of the input waveguides 502.

Loss is generated due to the different cross-sectional widths of the output waveguide. To produce output signals that exhibit a uniform amplitude spectrum, the greatest loss is introduced at the center waveguide and correspondingly less loss introduced at each adjacent waveguide thereafter. For example, in FIG. 5, waveguide grating router 500 includes a plurality of output waveguides 510–518 having a center waveguide 514 and adjacent waveguides 512 and 516, as illustrated. The center waveguide 514 has a width of $\alpha$, the adjacent waveguides 512 and 516 have a width of $\delta$, and waveguides 510 and 518 have a width of $\eta$, where $\alpha > \delta > \eta$ and each coordinate is adjusted in such a way that the router's output signals exhibit a uniform amplitude spectrum. Accordingly, the center waveguide 514 has the greatest cross-sectional width. Next, waveguides 512 and 516 adjacent to the center waveguides are smaller in cross-section than waveguide 514 and the waveguides 510 and 518 are smaller in cross-section than waveguides 512 and 516. These output signals incur loss proportional to the cross-sectional width of each output waveguide, thus, a uniform amplitude spectrum is achieved.

As discussed above, loss may be introduced by varying the cross-sectional area of an input waveguide with respect to that of an output waveguide. Variation in cross-sectional width of an input waveguide and an output waveguide with reference to one another generates a difference in field and, thus, proportional radiation losses. Mathematically, the loss is depends on an overlap integral between the fields at the input waveguides, for example, $702_i$, i=1, 2, 3, ... N, in FIG. 6, and the output waveguides, for example, $730_k$, k=1, 2, 3, ... N, in FIG. 6. The overlap integral, also known as the transmission coefficient between waveguides, for example i and k, is governed by:

$$T_{i,k} = \int \int f_i(x,y) f_k(x,y) dx dy$$

where $f_i$ and $f_k$ are the radiation fields at the cross-section of the input waveguide i and output waveguide k and x and y are the spatial coordinates that span the cross-section. Accordingly, the better the match or overlap the lower the loss therein. Normally, the fields between two waveguides are a combination of radiation fields and waveguide modes, whose number, extent, shape, character, etc., depend on the size, shape, and index of the waveguide. This overlap integral can also describe relative differences in angular tilt and spatial position. Thus, in accordance with the present invention, loss elements can be introduced to the input waveguides with respect to the loss elements introduced to the output waveguides to produce the desired predetermined composite amplitude spectrum.

Since the transmission coefficients $T_{ik}$ of a N×N waveguide grating router form a N×N matrix, there are $N^2$ independent values that must be accounted for to introduce the desired losses to produce the desired predetermined composite amplitude spectrum. However, since the transmission $T_{ik}$ coefficients values are interdependent, they can be modified (or equalized to achieve a uniform composite amplitude spectrum) by using only 2N adjustments to the waveguides. By choosing 2N radiation fields (or 2N cross-sectional widths in the waveguides) the $N^2$ transmission coefficients can be satisfied because not all of the radiation fields are unique and not all of the transmission coefficients are unique. Advantageously, complete equalization of a N×N waveguide grating router with $N^2$ possible transmission $T_{ik}$ coefficients can be accomplished with 2(N−2) adjustments to the waveguides, as shown in FIG. 6.

Figure 6:
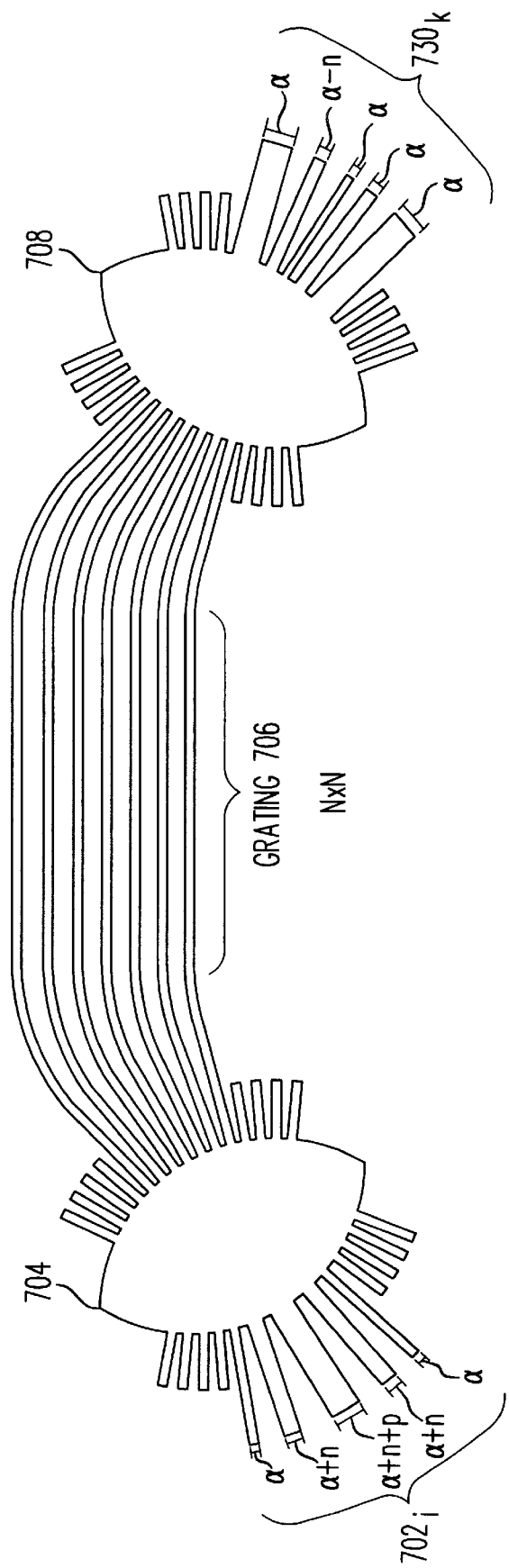
FIG. 6 shows another illustrative embodiment of an N×N router with loss equalization.

As illustrated in FIG. 6, an embodiment of a N×N waveguide grating router 700 having N input waveguides and N output waveguides is shown. The waveguide grating router includes a plurality of input waveguides $702_i$, a first free space region 704, an optical grating 706, a second free space region 708, and a plurality of output waveguides $730_k$. A plurality of multiwavelength signals is received by the plurality of input waveguides 702. The signals are coupled at the first free space region 704. The coupled signal is launched into the optical grating 706. Due to differing lengths and curvature of each waveguide within the optical grating 706, where each waveguide is separated by a fixed amount, the optical grating 706 phase-shifts each signal transmitted through each output waveguide. Ultimately, the multiwavelength signals received by the plurality of input waveguides are transmitted through the router and separated into output signals, each having a specific wavelength component of the signals received. Since the cross-sectional widths of the plurality of input waveguides $702_i$ differ from the cross-sectional widths of the plurality of output waveguides $730_k$, the signals suffer loss such that a uniform amplitude spectrum is achieved. The widths of the input waveguides $702_i$ are set in such a fashion as to allow the center input waveguide to experience the greatest loss and, correspondingly, each adjacent waveguide thereafter experiences less loss. The widths of the plurality of output waveguides $730_k$ are set such that the center output waveguide experience the least loss and, correspondingly, each adjacent waveguide thereafter experiences greater loss.

The exemplary embodiment described above is but one of a number of alternative embodiments of the invention that will be apparent to those skilled in the art in view of the foregoing description. Accordingly, this description is to be construed as illustrative only and is for the purpose of teaching those skilled in the art the best mode of carrying out the invention. Various other alternatives can be devised by one skilled in the art without departing from the teachings of this invention.

I claim:

1. An optical apparatus comprising:
   a plurality of input waveguides;
   a first free space region connected to the plurality of input waveguides
   an optical grating connected to the first free space region, the grating including a plurality of unequal length waveguides;
   a second free space region connected to the grating; and
   a plurality of output waveguides connected to the second free space region;
   CHARACTERIZED IN THAT
   selected ones of the plurality of input waveguides include a means for introducing input loss to input signals to input signals and selected ones of the plurality of output waveguides include a means for introducing output loss to output signals such that when the input signals are applied to the plurality of input waveguides the plurality of output waveguides provide output signals exhibiting a predetermined composite amplitude spectrum.

2. The optical apparatus according to claim 1 wherein at least one of the output loss introducing means is a directional coupler.

3. The optical apparatus according to claim 1 wherein at least one of the output loss introducing means is a wavelength selective filter.

4. The optical apparatus according to claim 1 wherein at least one of the output loss introducing means is a Y-branch splitter.

5. The optical apparatus according to claim 1 wherein at least one of the output loss introducing means is a cross-sectional difference between a first and second ones of the plurality of output waveguides.

6. The optical apparatus according to claim 1 wherein at least one of the input loss introducing means is a directional coupler.

7. The optical apparatus according to claim 1 wherein at least one of the input loss introducing means is a wavelength selective filter.

8. The optical apparatus according to claim 1 wherein at least one of the input loss introducing means is a Y-branch splitter.

9. The optical apparatus according to claim 1 wherein at least one of both the input loss introducing means and the output loss introducing means is a cross-sectional difference between a first selected one of the plurality of input waveguides and a first selected one of the plurality of output waveguides.

10. The optical apparatus according to claim 9 wherein the cross-sectional difference is defined by the relationship:

$$T_{ik} = \int \int f_i(x,y) f_k(x,y) dx dy$$

wherein $f_i$ and $f_k$ are the respective radiation fields at the cross-section of the first selected one of the plurality of input waveguides and the first selected one of the plurality of output waveguides and x and y are the spatial coordinates that span the cross-section.

11. The optical apparatus according to claim 5 wherein the cross-sectional difference between the first and second selected ones of the plurality of output waveguides is the characteristic of width.

12. The optical apparatus according to claim 1 wherein the predetermined composite amplitude spectrum is substantially uniform.

13. The optical apparatus according to claim 12 wherein both the input loss introducing means and the output loss introducing means are variable input loss introducing means and variable output loss introducing means, respectively.

14. The optical apparatus according to claim 13 further having an amplifying element to amplify the predetermined composite amplitude spectrum to be substantially equal to the amplitude of the input signal.

15. The optical apparatus according to claim 14 wherein apparatus is one selected from the group consisting of a 1×N splitter, N×1 splitter, optical switch, multiplexer, demultiplexer, detector, add/drop filter, and N×N array.

16. A method of forming a predetermined composite amplitude spectrum of an optical apparatus having a first and second free space region, an optical grating coupled therebetween, the grating including a plurality of unequal length waveguides, and the optical apparatus having a plurality of input waveguides coupled to the first free space region and a plurality of output waveguides coupled to the second free space region, the method comprising the steps of:

configuring at least one of the plurality of input waveguides with a means for introducing input loss to a signal applied to at least one of the plurality of input waveguides;

configuring at least one of the plurality of output waveguides with a means for introducing output loss to a signal applied to at least one of the plurality of output waveguides; and varying the loss such that a predetermined composite amplitude spectrum is produced.

* * * * *